United States Patent
Yuan et al.

(10) Patent No.: US 12,438,670 B2
(45) Date of Patent: Oct. 7, 2025

(54) PILOT TRANSMISSION METHOD AND DEVICE

(71) Applicant: VIVO MOBILE COMMUNICATION CO., LTD., Guangdong (CN)

(72) Inventors: Pu Yuan, Guangdong (CN); Dajie Jiang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 326 days.

(21) Appl. No.: 18/168,030

(22) Filed: Feb. 13, 2023

(65) Prior Publication Data

US 2023/0188295 A1   Jun. 15, 2023

Related U.S. Application Data

(63) Continuation of application No. PCT/CN2021/114278, filed on Aug. 24, 2021.

(30) Foreign Application Priority Data

Aug. 24, 2020 (CN) .......................... 202010859876.7

(51) Int. Cl.
*H04L 5/00* (2006.01)
*H04L 27/26* (2006.01)

(52) U.S. Cl.
CPC ........ *H04L 5/0051* (2013.01); *H04L 27/2605* (2013.01); *H04L 27/261* (2013.01)

(58) Field of Classification Search
None
See application file for complete search history.

(56) References Cited

U.S. PATENT DOCUMENTS

| | | | |
|---|---|---|---|
| 5,692,013 A | 11/1997 | Koslov et al. | |
| 9,780,975 B1* | 10/2017 | Kwak | H04L 25/03343 |
| 2015/0263822 A1 | 9/2015 | Abdoli et al. | |
| 2017/0126451 A1* | 5/2017 | Kim | H04L 5/0048 |
| 2018/0205578 A1 | 7/2018 | Kwak et al. | |
| 2019/0313378 A1* | 10/2019 | Abdoli | H04W 52/325 |
| 2022/0263698 A1* | 8/2022 | Harada | H04L 1/0002 |

FOREIGN PATENT DOCUMENTS

| | | |
|---|---|---|
| CN | 104394110 A | 3/2015 |
| CN | 106464443 A | 2/2017 |
| CN | 206775509 U | 12/2017 |
| CN | 110266617 A | 9/2019 |
| CN | 110380994 A | 10/2019 |
| CN | 110545142 A | 12/2019 |
| CN | 111327551 A | 6/2020 |

OTHER PUBLICATIONS

Hefnawy, et al., "Overview of Faster-Than-Nyquist for Future Mobile Communication Systems", DOCOMO Communications Laboratories Europe GmbH, IEEE, Munich, Germany, 2013.

* cited by examiner

*Primary Examiner* — Diane L Lo
(74) *Attorney, Agent, or Firm* — Price Heneveld LLP

(57) ABSTRACT

Embodiments of this application disclose a pilot transmission method and device. The method includes: inserting, by a communications device, a pilot symbol into a first data sequence to obtain a second data sequence; and transmitting, by the communications device, the second data sequence, where the second data sequence has been subjected to faster-than-Nyquist processing.

19 Claims, 7 Drawing Sheets

PILOT TRANSMISSION METHOD AND DEVICE

CROSS-REFERENCE TO RELATED APPLICATIONS

This application is a continuation application of International Application No. PCT/CN2021/114278 filed on Aug. 24, 2021, which claims priority to Chinese Patent Application No. 202010859876.7, filed in China on Aug. 24, 2020 and entitled "PILOT TRANSMISSION METHOD AND DEVICE", which are incorporated herein by reference in their entireties.

TECHNICAL FIELD

This application pertains to the field of communications technologies, and specifically relates to a pilot transmission method and device.

BACKGROUND

Faster-than-Nyquist (FTN) preprocesses transmit signals (also referred to as waveform coding), able to improve the symbol rate, or the number of symbols transmitted per hertz per second (Hz*s).

In a complex electromagnetic wave transmission environment, due to the presence of large quantities of scattering, reflection, and refraction planes, a radio signal arrives at a receiving antenna by different paths at different times. This phenomenon is referred to as multipath prorogation. In a case that successive symbols of a signal transmitted arrive simultaneously by different paths, or a later symbol arrives within a delay spread of an earlier symbol, inter-symbol interference (ISI) is caused. Similarly, in frequency domain, due to reasons such as frequency shifting and Doppler effect, subcarriers of a signal shift in frequency to different extents, causing overlapping of subcarriers which are probably orthogonal otherwise. Such overlapping is called inter-channel interference (ICI).

The effects of waveform coding and multipath channel together increase the quantity of equal-cost paths, resulting in "smaller" symbol and subcarrier gaps, adding to the degree of equal-cost overlapping in time and frequency domains. The increased overlapping in time and frequency domains is reflected as more serious ISI and ICI at the receive end, challenging the design of receivers.

For the above reasons, it is typically necessary to insert a known signal (known as pilot in a single-carrier system) so as to make channel estimation by finding differences in the known signal between the transmit end and the receive end. In a conventional single-carrier system, pilots exist in periodic bursts, where a burst is generally a sequence including tens to hundreds of symbols. Because of overhead limitation, pilots cannot be transmitted very frequently. Therefore, for fast time-varying channels, channel dynamics cannot be well captured with the conventional solution.

SUMMARY

According to a first aspect, a pilot transmission method is provided, where the method includes: inserting, by a communications device, a pilot symbol into a first data sequence to obtain a second data sequence; and transmitting, by the communications device, the second data sequence, where the second data sequence has been subjected to faster-than-Nyquist processing.

According to a second aspect, a communications device is provided, including: a pilot insertion module, configured to insert a pilot symbol into a first data sequence to obtain a second data sequence; and a transmitting module, configured to transmit the second data sequence, where the second data sequence has been subjected to faster-than-Nyquist processing.

According to a third aspect, a communications device is provided, where the communications device includes a processor, a memory, and a program or instructions stored on the memory and capable of running on the processor, and when the program or instructions are executed by the processor, the method according to the first aspect is implemented.

According to a fourth aspect, a readable storage medium is provided, where the readable storage medium stores a program or instructions, and when the program or instructions are executed by a processor, the method according to the first aspect is implemented.

According to a fifth aspect, a computer program product is provided, where the computer program product includes a processor, a memory, and a program or instructions stored on the memory and capable of running on the processor, and when the program or instructions are executed by the processor, the method according to the first aspect is implemented.

According to a sixth aspect, a chip is provided, where the chip includes a processor and a communications interface, the communications interface is coupled to the processor, and the processor is configured to run a program or instructions to implement the method according to the first aspect.

In the embodiments of this application, the communications device inserts the pilot symbol into the first data sequence to obtain the second data sequence. In this way, the data symbols and the inserted pilot symbol in the second data sequence are interleaved. In the embodiments of this application, pilot symbols can be arranged in a data frame in a distributed manner.

DESCRIPTION OF EMBODIMENTS

The following describes the technical solutions in the embodiments of this application with reference to the accompanying drawings in the embodiments of this application. Apparently, the described embodiments are some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects instead of describing a specific order or sequence. It should be understood that a number used in this way may be interchangeable in an appropriate case, so that the embodiments of this application can be implemented in a sequence other than those shown or described herein. Objects distinguished by "first" and "second" are usually of one type, and a quantity of objects is not limited. For example, a first object may be one, or may be a plurality. In addition, in the specification and the claims, "and/or" represents at least one of the connected objects, and the character "/" usually represents an "or" relationship between the associated objects.

It should be noted that the technology described in embodiments of this application is not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The described technology may be used in the foregoing system and radio technology, or may be used in another system and radio technology. However, in the following descriptions, a new radio (NR) system is described for an illustration purpose, and NR terms are used in most of the following descriptions. These technologies may also be applied to other applications than an NR system application, such as 6th Generation (6G) communications systems.

Figure 1:
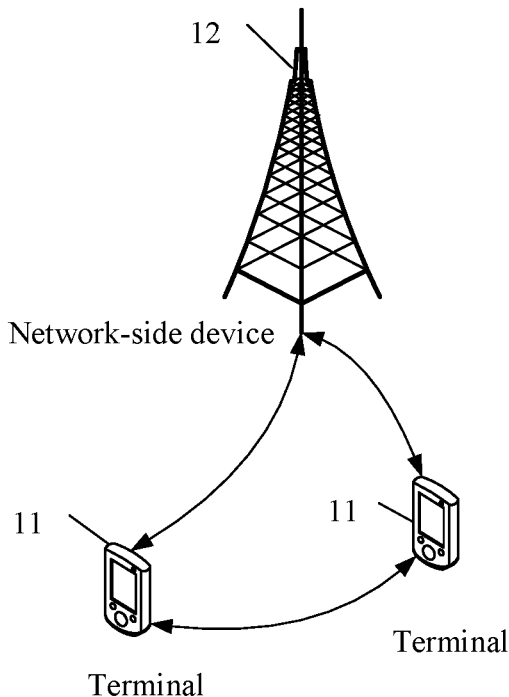
FIG. 1 is a block diagram of a wireless communications system according to an embodiment of this application.

FIG. 1 is a block diagram of a wireless communications system to which embodiments of this application are applicable. The wireless communications system includes a terminal 11 and a network-side device 12. The terminal 11 may also be referred to as terminal device or user equipment (UE). The terminal 11 may be a terminal-side device such as a mobile phone, a tablet personal computer, a laptop computer or notebook computer, a personal digital assistant (PDA), a palmtop computer, a netbook, an ultra-mobile personal computer (UMPC), a mobile Internet device (MID), a wearable device, a vehicle user equipment (VUE), or a pedestrian user equipment (PUE). The wearable device includes a band, earphones, glasses, and the like. It should be noted that a specific type of the terminal 11 is not limited in the embodiments of this application. The network-side device 12 may be a base station or a core network. The base station may be referred to as a node B, an evolved Node B (eNB), an access point, a base transceiver station (BTS), a radio base station, a basic service set (BSS), an extended service set (ESS), a next-generation NodeB (gNB), a home NodeB, a home evolved NodeB, a WLAN access point, a Wi-Fi node, a transmitting receiving point (TRP), or another appropriate term in the art. Provided that the same technical effects are achieved, the base station is not limited to a specific technical term. It should be noted that in the embodiments of this application, only a base station in an NR system is used as an example, but a specific type of the base station is not limited.

Inter-symbol interference (ISI) and/or inter-channel interference (ICI) generated in a process of a radio signal passing through a radio channel, together with ISI/ICI introduced by a transmitter using waveform coding, lead to more serious equal-cost ISI/ICI. Limited by hardware conditions, a receiver can implement decoding algorithms of limited complexity. In a case that the degree of overlapping exceeds a specified threshold, required decoding complexity increases greatly and exceeds the capability of the decoding algorithm, resulting in decoding failure. In this case, pilot symbols need to be introduced, so as to reduce decoding algorithm complexity at a receive end. Specifically, the receive end performs channel estimation on a radio channel by using a pilot symbol, performs compensation (channel equalization) for a receive end signal based on a result of the channel estimation, and then performs demodulation and decoding on a faster-than-Nyquist (FTN) signal.

In a conventional single-carrier system, pilots exist in periodic bursts (burst), where a burst is generally a sequence including tens to hundreds of symbols. Pilots and data are sent in separate blocks. Because of overhead limitation, pilots cannot be transmitted very frequently. Therefore, for fast time-varying channels, channel dynamics cannot be well captured with the conventional solution.

In addition, in FTN transmission, to generate a pilot without inter symbol interference (ISI) and data with ISI in a conventional solution, if the same baseband processing is used, it is necessary to use a shaping filter of a same order as data for a pilot symbol and perform corresponding upsampling. This may cause unnecessary overheads (the pilot symbol does not need to be transmitted in an overlapping manner, and overlapping transmission of the pilot symbol will result in unnecessary overheads; therefore, a shaping filter of a smaller order can be used). In some alternative embodiments, to reduce baseband processing overheads of pilot symbols, using two basebands for parallel processing or use one baseband for longer time serial processing is necessary, at the cost of more complex process or hardware implementation.

In conclusion, in the pilot insertion solution for conventional single-carrier systems, a pilot is a burst of symbols and is sent in separate blocks from data. As a result, time-varying dynamics of a channel cannot be well captured. In addition, according to the conventional solution, if pilot symbols and data are processed together in the baseband, pilot baseband processing overheads are increased; and if the pilot symbols and data are processed separately, process or hardware implementation is complex.

To resolve the foregoing technical problems, the following is a main idea of the embodiments of this application: a pilot symbol is inserted into a data sequence. In the embodiments of this application, as compared to a solution that a pilot is a burst of symbols and pilots and data are sent in separate blocks, overheads are small, and channel dynamics can be well captured.

In addition, in the embodiments of this application, a pilot symbol is inserted, and a zero-level symbol is inserted to at least one of the left or right sides of the pilot symbol. This allows pilot symbols and data of a communications device to be processed together, simplifying a baseband signal processing procedure at a receiving end and a transmission end. For example, the communications device at the transmit end may use a shaping filter of a same order as data symbols for the pilot symbol, so as to reduce baseband processing overheads of the pilot symbol. The pilot symbol and the data symbol do not need to be processed in parallel by two baseband respectively, allowing for simple procedure or hardware implementation.

As mentioned above, one or more zero-level symbols are also set on at least one of the left or right ends (or referred to as two sides) of the pilot symbol, and the one or more zero-level symbols may be referred to as guard symbols. A pilot symbol and one or more guard symbols on at least one of the two sides of the pilot symbol are referred to as a pilot symbol group. In each pilot symbol group, a quantity of pilot symbols may be 1. In other words, channel estimation is performed by using a single-point pilot, so as to reduce overheads of the channel estimation.

The pilot transmission method provided in this embodiment of this application can be applied to faster-than-Nyquist transmission. A quantity of guard symbols on at least one end of a pilot symbol and a time domain overlapping coefficient τ of FTN are calculated according to a rule described later in this embodiment of this application. After baseband processing, both pilot symbols without inter-symbol interference (ISI) and data symbols with ISI can be obtained. Through the pilot symbol without ISI, channel dynamics can be more accurately captured.

With reference to the accompanying drawings, the following describes in detail the pilot transmission method and device provided in the embodiments of this application by using specific embodiments and application scenarios thereof.

Figure 2:
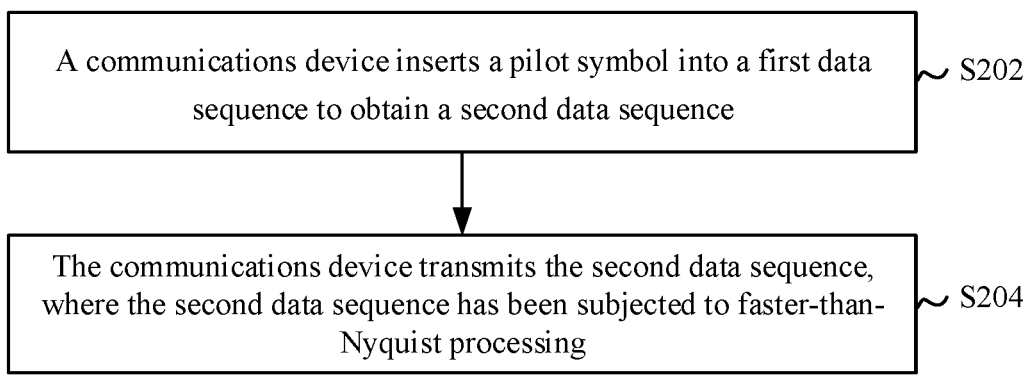
FIG. 2 is a schematic flowchart of a pilot transmission method according to an embodiment of this application.

As shown in FIG. 2, an embodiment of this application provides a pilot transmission method 200. The method may be executed by a communications device. In other words, the method may be executed by software or hardware installed in the communications device. The method includes the following steps.

S202: The communications device inserts a pilot symbol into a first data sequence to obtain a second data sequence.

S204: The communications device transmits the second data sequence, where the second data sequence has been subjected to faster-than-Nyquist processing.

The pilot transmission method provided in this embodiment of this application can be applied to a single-carrier system.

In this embodiment of this application, before transmitting the second data sequence, the communications device may further perform the faster-than-Nyquist (FTN) processing on the second data sequence. The FTN processing may include the following two steps: upsampling processing; and matching filtering processing by the shaping filter. The inserting a pilot symbol into a first data sequence in S202 may be performed before the step of upsampling processing, or may be performed after the step of upsampling processing and before the matching filtering processing.

In some embodiments, in the second data sequence obtained by inserting the pilot symbol, zero-level symbols are arranged on at least one of two ends of the pilot symbol. For example, a plurality of zero-level symbols are arranged at the left end of the pilot symbol; a plurality of zero-level symbols are arranged at the right end of the pilot symbol; or a plurality of zero-level symbols are arranged at the left end of the pilot symbol, and a plurality of zero-level symbols are also arranged at the right end of the pilot symbol.

In a specific example, in a case that zero-level symbols are arranged at both ends of the pilot symbol, the zero-level symbols at two ends of the pilot symbol are equal in quantity, or the zero-level symbols at two ends of the pilot symbol differ by 1 in quantity.

In this embodiment, the communications device transmits the second data sequence in S204. In some embodiments, the second data sequence is sent in a first sub-frame. One such first sub-frame includes a guard gap (GAP), the pilot symbol, and a data segment. In one such first sub-frame, the number of pilot symbols may be 1.

In some embodiments, a frame structure in which the first sub-frame is located includes a plurality of such first sub-frames, each of the first sub-frames including one such guard gap, one such pilot symbol, and one such data segment.

In some embodiments, the frame structure further includes a second sub-frame, and the second sub-frame is used for transmitting a sync burst. The number of second sub-frames in each frame structures is 1, and the second sub-frame may be located at a header of the frame structure.

In the pilot transmission method provided in this embodiment of this application, the communications device inserts the pilot symbol into the first data sequence to obtain the second data sequence. In this way, the data symbols and the inserted pilot symbol in the second data sequence are interleaved. In this embodiment of this application, pilot symbols can be arranged in a data frame in a distributed manner. This can resolve a problem that pilots arranged in a centralized manner in a conventional solution cannot well track time-varying characteristics of a channel, and also reduces overheads. In addition, in this embodiment of this application, the insertion positions and insertion density of the pilot symbols can be flexibly adjusted based on channel status, improving flexibility of pilot transmission.

It can be understood that, in a case that a time-varying characteristic of a channel changes rapidly (for example, the time-varying characteristic meets a first condition), in this embodiment of this application, insertion density of pilot symbols can be increased, so as to better track the time-varying characteristic of the channel; and in a case that a time-varying characteristic of a channel changes slowly (for example, the time-varying characteristic meets a second condition), in this embodiment of this application, insertion density of pilot symbols can be reduced, so as to reduce overheads.

In addition, in this embodiment of this application, insertion positions of the pilot symbols can be adjusted. For example, the pilot symbol is inserted between a guard gap and a data segment. In this way, no zero-level symbol needs to be added between the guard gap and the pilot symbols, and only a specified number of zero-level symbols are needed between the pilot symbol and the data segment, thereby reducing overheads (for details, refer to Embodiment 4). Herein, a specified number of zero-level symbols are added to ensure no ISI between the pilot symbols and the data symbols.

In some embodiments, in the pilot transmission method 200, after the communications device inserts the pilot symbol into the first data sequence to obtain the second data sequence (before S204), the method further includes the following step: performing, by the communications device, upsampling processing on the second data sequence, where the faster-than-Nyquist processing includes the upsampling processing. This embodiment corresponds to Embodiment 1.

After the performing upsampling processing on the second data sequence, the method further includes: adding zero-level symbols to the second data sequence on at least one side of the pilot symbol.

In a specific example, the number of zero-level symbols added satisfies the following equation:

$K \geq L^\circ - 2N + 1$, where

K is the number of zero-level symbols added; $L^\circ$ is a minimum total number of the pilot symbol and zero-level symbols adjacent to the pilot symbol after the pilot symbol is inserted; and N is an upsampling factor for the upsampling processing.

$L^\circ$ used in the embodiments of this application may be a minimum total number (which needs to be ISI-free) of the pilot symbol and zero-level symbols on both sides of the pilot symbols in the pilot symbol group. The minimum value means that if the number of symbols in the pilot symbol group is less than $L^\circ$, the pilot symbols may cause ISI; and if the number of symbols in the pilot symbol group is greater than or equal to $L^\circ$, the pilot symbols without ISI can be implemented.

A rule for inserting zero-level symbols in this embodiment may be: the zero-level symbols at two ends of the pilot symbol are equal in quantity, or the zero-level symbols at two ends of the pilot symbol differ by 1 in quantity.

In another embodiment, for example, in Embodiment 4, zero-level symbols need to be inserted on only one side of the pilot symbol, and the number of zero-level symbols inserted may be half of a value calculated according to the foregoing equation, that is, $$K \geq \frac{L^\circ - 2N + 1}{2}.$$

In this embodiment, both the pilot symbol without ISI and the data symbol with ISI can be obtained by adding the zero-level pilot symbols. Through the pilot symbol without ISI, channel dynamics can be more accurately captured.

In some embodiments, in the pilot transmission method 200, before the communications device inserts the pilot symbol into the first data sequence to obtain the second data sequence, the method further includes: performing, by the communications device, upsampling processing on the first data sequence, where the faster-than-Nyquist processing includes the upsampling processing. This embodiment corresponds to Embodiment 2.

Before the performing, by the communications device, upsampling processing on the first data sequence, the method further includes: adding zero-level symbols to the first data sequence at a position at which the pilot symbol is to be inserted. The adding zero-level symbols mentioned in this example may be performing a zeroing operation on data symbols in the original data sequence at a position at which the pilot symbol is to be inserted; or may be adding zero-level symbols to the original data.

In an example, the number of zero-level symbols added satisfies the following equation:

$$q \geq \frac{L^\circ - N + 1}{N},$$

where q is the number of zero-level symbols added; $L^\circ$ is a minimum total number of the pilot symbol and zero-level symbols adjacent to the pilot symbol after the pilot symbol is inserted; and N is an upsampling factor for the upsampling processing.

A rule for inserting zero-level symbols in this embodiment may be: the zero-level symbols at two ends of the pilot symbol are equal in quantity, or the zero-level symbols at two ends of the pilot symbol differ by 1 in quantity.

In another embodiment, for example, in Embodiment 4, zero-level symbols need to be inserted on only one side of the pilot symbol, and the number of zero-level symbols inserted may be half of a value calculated according to the foregoing equation, that is, $$q \geq \frac{L^\circ - N + 1}{2N}.$$

In this embodiment, both the pilot symbol without ISI and the data symbol with ISI can be obtained by adding the zero-level pilot symbols. Through the pilot symbol without ISI, channel dynamics can be more accurately captured.

In some embodiments, in the foregoing two examples, the minimum total number of the pilot symbol and zero-level symbols adjacent to the pilot symbol after the pilot symbol is inserted is determined using the following equation:

$L^\circ = \lceil 2N/\tau \rceil$, where $\tau$ is a time domain overlap coefficient for the faster-than-Nyquist processing.

To describe in detail the number of added zero-level symbols mentioned in the foregoing several embodiments, the following describes an implementation principle thereof.

During FTN baseband signal processing, flexible adjustment of a time domain overlap coefficient $\tau$ is implemented by separately adjusting data and an upsampling coefficient of a shaping filter. If an upsampling factor of the data is N (that is, the number of data sampling points in one symbol time/sampling period T; as data in one symbol time is an impulse response, the upsampling is equivalent to an operation of padding (N−1) zeros), and an upsampling factor of the shaping filter is M (that is, the number of points sampled by the filter in one symbol time/sampling period T T), the following equation holds:

$$\tau = \frac{N}{M}, 0 < \tau \leq 1, 0 < N \leq M$$

Overlapped X-domain multiplexing (OVXDM) is a special example of the FTN technology. In OVTDM, $\tau$ is a series of discrete point values:

$$\tau = \frac{1}{K}$$

In a case of $\tau 1/K$, an OVXTM signal obtained can be referred to as a K-times overlap of a Nyquist sampled signal. For an FTN system, the FTN signal with $\tau = N/M$ can be considered as a M/N-times overlap of a Nyquist sampled signal.

The following analyzes the general rules for pilot symbol insertion. Given that a sampling period of the Nyquist signal is T, the sampling period of the FTN signal is $\tau T$. It is assumed that in the second data sequence mentioned in the foregoing embodiment, a pilot symbol is $p_0$, and two data symbols respectively adjacent to the left and right of a pilot symbol group centered on $p_0$ are $x_-$ and $x_+$. The concept of pilot symbol group has been described in the foregoing embodiment: a pilot symbol group includes a pilot symbol and one or more zero-level symbols on at least one of the left or right ends of the pilot symbol.

It is assumed that a distance between $p_0$ and $x_-$ is $t_-$, a distance between $p_0$ and $x_+$ is $t_+$, and a distance between $x_-$ and $x_+$ is $t_\pm$, and a sufficient and necessary condition for no inter-symbol interference between the pilot symbol $p_0$ and the data symbols $x_-$ and $x_+$ is:

$$t_- \geq T, t_+ \geq T$$

Thus, $$t_\pm = t_- + t_+ \geq 2T$$

For a transmit sequence $x[n]$ obtained after N-times upsampling processing, that is, the first data sequence mentioned in the foregoing embodiment, a symbol gap of the transmit sequence is $\tau T$. Let the number of symbols between $x_-$ and $x_+$ to be allocated to the pilot symbol group be L, then L satisfies $$L * \frac{\tau T}{N} \geq 2T,$$

and a minimum value of L that satisfies the condition is:

$$L^\circ = \lceil 2N/\tau \rceil$$

This equation means rounding up. In $L^\circ$ upsampling symbols, it is assumed that the number of original data symbols actually transmitted is q (the q data symbols may actually be zeroed). Due to the upsampling, the number of zero-level symbols added is $(q+1)*(N-1)$, and the following equation holds:

$$q+(q+1)*(N-1)=L^\circ$$

so, $$q = \frac{L^\circ - N + 1}{N}$$

Therefore, the number of original symbols that are in the original data symbols and that need to be zeroed as the guard symbols for the inserted pilot symbol is obtained.

In this embodiment of this application, the pilot symbol may be inserted to the central position of the L upsampling symbols, so as to ensure no inter-symbol interference between the pilot symbol and the data symbols. It is assumed that a pilot symbol group of length L is $S=\{s_0, s_1, \ldots, s_{L-1}\}$.

When L is an odd number, the pilot symbol is located in the center of the pilot symbol group, that is:

$$s_{\frac{L-1}{2}} = \rho_0, s_j = 0, j \neq \frac{L-1}{2}$$

When L is an even number, a position of the pilot symbol is as follows:

$$s_{\frac{L}{2}} = \rho_0, s_j = 0, j \neq \frac{L}{2}$$

or;

$$s_{\frac{L}{2}-1} = \rho_0, s_j = 0, j \neq \frac{L}{2}-1$$

Figure 3:
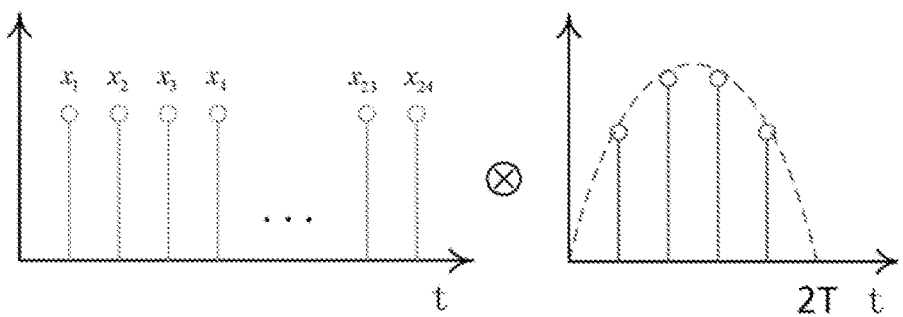
FIG. 3 is a schematic diagram of operations of a shaping filter according to an embodiment of this application.

The following uses an example to describe a principle of this embodiment of this application. As shown in FIG. 3, a convolution operation is performed based on the transmit data sequence $x[n]$ and the used shaping filter. N=2, M=3, where N is the upsampling factor for the upsampling processing, and M is the upsampling factor of the shaping filter.

Figure 4:
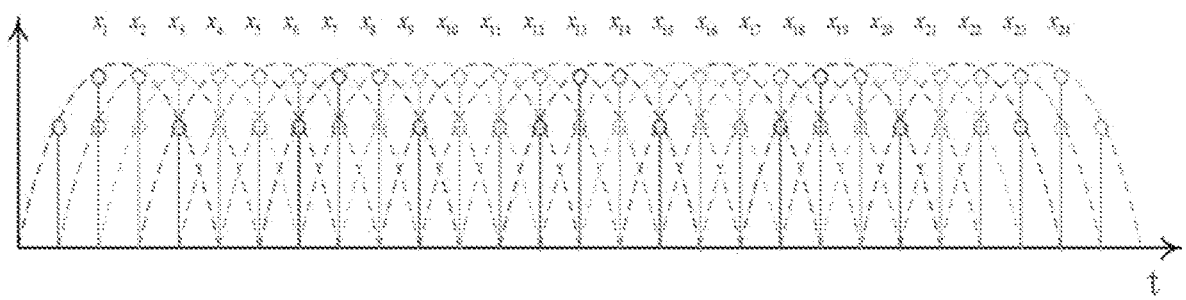
FIG. 4 is a schematic diagram of an effect of shaping filter according to an embodiment of this application.

The waveform shown in FIG. 4 is obtained through the foregoing convolution operation. It should be noted that, for ease of description, different filter waveforms are used to represent the forms of symbol waveform overlapping. An actual waveform envelope should be an overlap effect of these filter waveforms.

Figure 5:
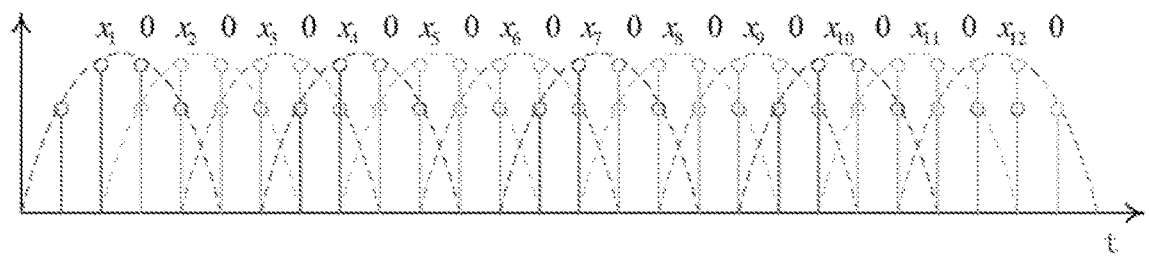
FIG. 5 is a schematic diagram of a data sequence obtained after upsampling processing according to an embodiment of this application.

Assuming twice sampling processing, a transmit sequence (that is, the first data sequence) is zero-padded at intervals, and there is no waveform component at the position of the zero-level symbol. The actual waveform decomposition is shown in FIG. 5.

At this time, if a pilot symbol is to be inserted after $x_2$, the interval between $x_2$ and $x_5$ needs to satisfy the equation: $t_\pm = t_- + t_+ \geq 2T$. Therefore, $x_3$ and $x_4$ need to be zeroed, and a pilot symbol $p_0$ is placed at the center of the sampling point between $x_2$ and $x_5$, as shown in FIG. 6.

Figure 6:
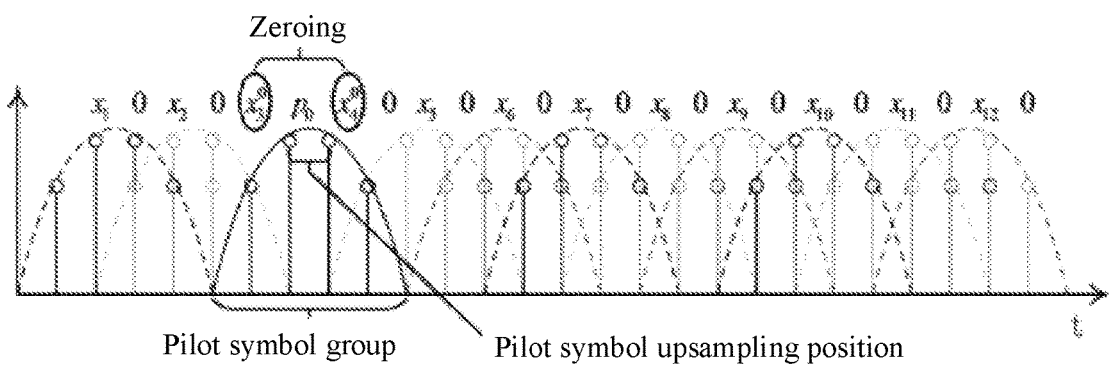
FIG. 6 is a schematic diagram of positions of inserted pilot symbols according to an embodiment of this application.

It can be seen that, at the sampling point of the pilot signal shown in FIG. 6, there is no primary lobe interference from data symbol pulses; and at the sampling point of the data signal, ISI is maintained.

Figure 7:
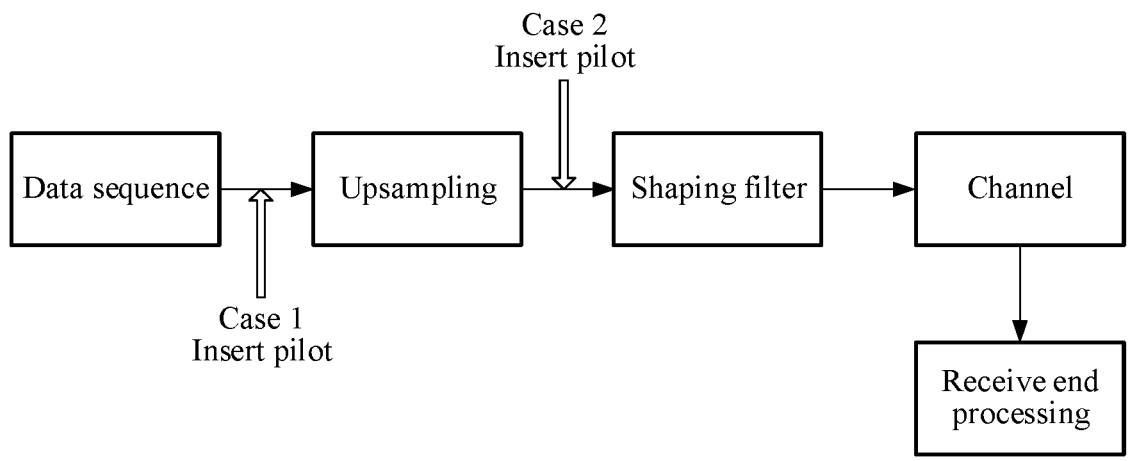
FIG. 7 is a schematic flowchart of baseband signal processing according to an embodiment of this application.

The technical solutions provided in the embodiments of this application can be flexibly implemented at different stages of baseband signal processing. As shown in FIG. 7, the vertical arrows point to the nodes at which pilot symbols can be inserted. Case 1 and Case 2 are respectively described in Embodiment 1 and Embodiment 2.

Embodiment 1

Embodiment 1 corresponds to Case 1 in FIG. 7. In this embodiment, it is assumed that a pilot mapping position (that is, the position at which the pilot symbol is to be inserted in the foregoing embodiment) has been determined, and that the pilot symbol is directly inserted into a specific position of the original data symbol.

After the data is N-times upsampled, the number of zero-level symbols on each of the left and right sides of the pilot symbol is N−1. According to the aforementioned equation $L^\circ = \lceil 2N/\tau \rceil$, the number of pilot symbol groups to ensure a pilot without interference is $L^\circ$, and with one pilot symbol subtracted, the number of zero-level symbols in the pilot symbol group is $L^\circ - 1$, so zeros are added (that is, zero-level symbols are added) on both sides of the position of the pilot symbol in the upsampled second data sequence, to ensure that the number of zeros added satisfies the following equation:

$$K \geq L^\circ - 1 - 2*(N-1) = L^\circ - 2N + 1$$

After the foregoing zero padding, zero-level symbols are arranged at both ends of the pilot symbol, and the zero-level symbols on two ends of the pilot symbol is equal in quantity, or the zero-level symbols on two ends of the pilot symbol differ by 1 in quantity.

Embodiment 2

Embodiment 2 corresponds to Case 2 in FIG. 7. In this embodiment, assuming that the pilot mapping location has been determined, a zero pre-padding operation needs to be performed on the original data.

As shown in FIG. 6, it is assumed that an information bit of the original data is $\{x_1, x_2, x_5, \ldots\}$. "Virtual" $x_3$ and $x_4$, which are actually a zero-level time interval that is one symbol long, are inserted between $x_2$ and $x_5$, to achieve a design effect of this embodiment of this application. The signal preprocessed in such way is subjected to upsampling processing, so as to obtain an upsampling signal. Then the pilot symbol is inserted into a position between $x_3$ and $x_4$ of the upsampled signal.

Embodiment 3

Embodiment 3 describes a data processing technology in a pilot insertion solution according to an embodiment of this application.

The characteristics of the FTN technology determine that its data decoding complexity is exponentially related to the length L of data code segments that are in a convolution relationship. In a case that the pilot insertion solution provided in the embodiment of the application is used, it is assumed that W pilot symbols have been inserted, and that a data code block with a length of L is divided into W data code segments with a length of $$\frac{L}{W}.$$

There is no convolution relationship between data code segments, so that the data code segments can be decoded independently.

Assuming that binary phase shift keying (BPSK) modulation is used, complexity of a pilot burst scheme in the related technology is $O(2^L)$. With the pilot transmission method provided in this embodiment of this application, the complexity is reduced to $$O\!\left(2^{\frac{L}{K}}K\right).$$

Apparently, in most cases, the complexity is lower when the method in this embodiment of this application is used.

In addition, for higher-order modulation, assuming that the number of modulation symbol sets is rr., the complexity is $O(\text{rr}^L)$ and $$O\!\left(m^{\frac{L}{K}}K\right)$$

respectively. The pilot transmission method provided in this embodiment of this application presents more obvious advantages. Therefore, an additional advantage brought by the pilot insertion solution of the pilot transmission method provided in this embodiment of this application is that data split by pilot symbols can be processed separately, thereby reducing receiver decoding complexity.

Embodiment 4

Figure 8:
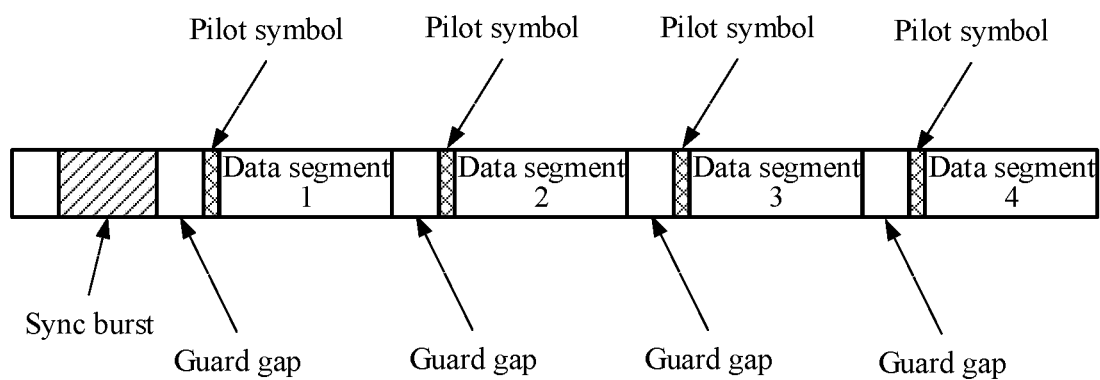
FIG. 8 is a schematic diagram of a frame structure according to an embodiment of this application.
Figure 9:
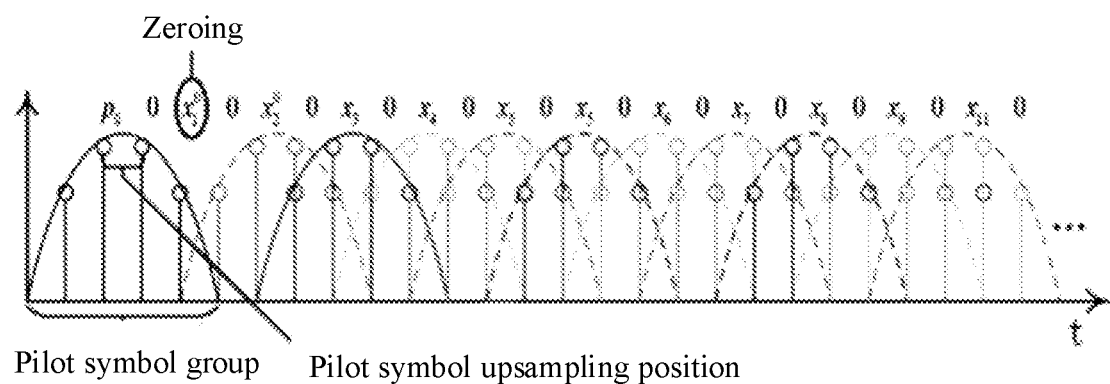
FIG. 9 is a schematic diagram of a gap GAP overhead reduction effect of the frame structure shown in FIG. 8.

Embodiment 4 provides a frame structure. With the pilot transmission method provided in the foregoing embodiment, positions of pilot symbols are properly arranged in the frame structure, which can further reduce guard gap (GAP) overheads in a multipath channel. The frame structure is shown in FIG. 8. FIG. 9 is a schematic diagram of a GAP overhead reduction effect of the frame structure shown in FIG. 8.

The frame structure provided in this embodiment includes a plurality of first sub-frames (three are shown in FIG. 8 as an example) and one second sub-frame. Each such first sub-frame includes a guard gap, a pilot symbol, and a data segment. In one first sub-frame, the number of pilot symbols may be 1. The second sub-frame in the frame structure is used for transmitting a sync burst.

The sync burst in the frame structure provided in this embodiment is used for obtaining timing synchronization.

1. Periodic sync bursts can be used for multipath estimation.
2. The dot-like discrete pilot symbols provided in this embodiment of this application can be used for accurate channel estimation.
3. A pilot symbol is placed at a start position of a data segment. A guard gap (GAP) is placed before the pilot symbol to deal with multipath interference. A zero-level symbol can be inserted between the pilot symbol and the data segment according to the solution described in the foregoing embodiment. Because the pilot symbol has a guard gap on the left side, no zero-level symbol needs to be inserted, so as to fully use protection of the guard gap, thereby reducing overheads.
   (a) This embodiment can ensure that the pilot symbol is ISI-free.
   (b) No additional GAP is needed between the pilot symbol and the data segment for the following reason: the pilot symbol is known, and the ISI caused by the multipath to the data can be cancelled through successive interference cancellation (SIC); or the FTN system uses the ML/MAP receiver, and the algorithm itself can overcome some ISI impact of a single-point pilot. This is different from an MMSE receiver of the traditional Nyquist system, whose performance is greatly affected by the ISI.
   (c) In a frame structure of the conventional solution, a GAP is also required before the data frame. In this solution, no additional overheads are caused by the GAP before the pilot symbol of the data segment.
   (d) For a pilot in a form of burst in the conventional solution, a multipath can be estimated by performing circumferential convolution; and 144 symbols or another number of symbols are used to increase the correlation peak energy for easier detection, and essentially for synchronization. In this embodiment of this application, this function is implemented by using a sync burst, and accurate channel estimation can be implemented simply using a subsequent single-point pilot symbol. This can reduce symbol overheads of channel estimation.
   (e) In an actual environment, multipath generation and elimination are relatively slow. Therefore, in this embodiment of this application, a sync burst with a relatively long period is used for tracking. If finer-granularity channel information is required, discrete single-point pilot symbols can be inserted to a data frame for accurate measurement.
4. Additional benefits of this embodiment of this application (similar to that described in Embodiment 3): A structure of a GAP+a pilot symbol+a data segment is equivalent that an FTN data flow is divided by an inserted pilot, so that the ISI brought by the FTN exists only between local data segments, and each data segment can be demodulated separately. This reduces a code length processed each time by a maximum likelihood (ML)/maximum-a-posteriori (MAP) receiver, and greatly reduces FTN demodulation complexity.

As for the first sub-frame mentioned in Embodiment 4, in another implementation, a data segment may be in a header of the first sub-frame, a guard gap is located at the end of the first sub-frame, and a pilot symbol is located between the data segment and the guard gap. This implementation can achieve a same or equivalent technical effect in the embodiment shown in FIG. 8.

It should be noted that the pilot transmission method provided in this embodiment of this application may be performed by a communications device, or a control module that is in the communications device and that is configured to perform the pilot transmission method. In an embodiment of this application, the communications device performing the pilot transmission method is used as an example to describe the communications device provided in this embodiment of this application.

Figure 10:
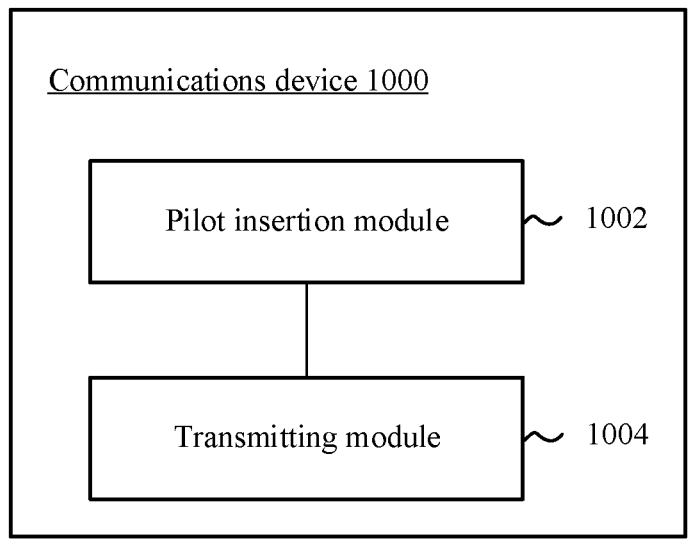
FIG. 10 is a schematic structural diagram of a communications device according to an embodiment of this application.

FIG. 10 is a schematic structural diagram of a communications device according to an embodiment of this application. The communications device may be a terminal, or may be a network-side device. As shown in FIG. 10, the communications device 1000 includes the following modules:

a pilot insertion module 1002, configured to insert a pilot symbol into a first data sequence to obtain a second data sequence; and a transmitting module 1004, configured to transmit the second data sequence, where the second data sequence has been subjected to faster-than-Nyquist processing.

In this embodiment of this application, the communications device inserts the pilot symbol into the first data sequence to obtain the second data sequence. In this way, the data symbols and the inserted pilot symbol in the second data sequence are interleaved. In this embodiment of this application, pilot symbols can be arranged in a data frame in a distributed manner. This can resolve a problem that pilots arranged in a centralized manner in a conventional solution cannot well track time-varying characteristics of a channel, and also reduces overheads. In addition, in this embodiment of this application, the insertion positions and insertion density of the pilot symbols can be flexibly adjusted based on channel status, improving flexibility of pilot transmission.

In some embodiments, the communications device 100 further includes a processing module, configured to perform upsampling processing on the second data sequence, where the faster-than-Nyquist processing includes the upsampling processing.

In some embodiments, the processing module is further configured to add a zero-level symbol to the second data sequence on at least one side of the pilot symbol.

In some embodiments, the number of zero-level symbols added satisfies the following equation:

$$K \geq L^\circ - 2N + 1, \text{ where}$$

K is the number of zero-level symbols added; is a minimum total number of the pilot symbol and zero-level symbols adjacent to the pilot symbol after the pilot symbol is inserted; and N is an upsampling factor for the upsampling processing.

In some embodiments, the communications device 1000 further includes a processing module, configured to perform upsampling processing on the first data sequence, where the faster-than-Nyquist processing includes the upsampling processing.

In some embodiments, the processing module is further configured to add a zero-level symbol to the first data sequence at a position at which the pilot symbol is to be inserted.

In some embodiments, the number of zero-level symbols added satisfies the following equation:

$$q \geq \frac{L^\circ - N + 1}{N},$$

where q is the number of zero-level symbols added; $L^\circ$ is a minimum total number of the pilot symbol and zero-level symbols adjacent to the pilot symbol after the pilot symbol is inserted; and N is an upsampling factor for the upsampling processing.

In some embodiments, the minimum total number of the pilot symbol and zero-level symbols adjacent to the pilot symbol after the pilot symbol is inserted is determined using the following equation:

$$L^\circ \lceil 2N/\tau \rceil, \text{ where}$$

$\tau$ is a time domain overlap coefficient for the faster-than-Nyquist processing.

In some embodiments, a zero-level symbol is arranged at at least one of two ends of the pilot symbol.

In some embodiments, in a case that the zero-level symbols are arranged at both ends of the pilot symbol, the zero-level symbols at two ends of the pilot symbol are equal in quantity, or the zero-level symbols at two ends of the pilot symbol differ by 1 in quantity.

In some embodiments, the second data sequence is transmitted in a first sub-frame, and the first sub-frame includes a guard gap, the pilot symbol, and a data segment.

In some embodiments, a frame structure in which the first sub-frame is located includes a plurality of such first sub-frames, each of the first sub-frames including one such guard gap, one such pilot symbol, and one such data segment.

In some embodiments, the frame structure further includes a second sub-frame, where the second sub-frame is located in a header of the frame structure, the second sub-frame is used for transmitting a sync burst, and a guard gap is arranged in a header of the second sub-frame.

In some embodiments, the communications device is a terminal or a network-side device.

For the communications device 1000 according to this embodiment of this application, reference may be made to the processes of the method 200 in the corresponding embodiment of this application, and the units/modules of the communications device 1000 and other operations and/or functions described above are respectively intended to implement the corresponding processes in the method 200, with the same or equivalent technical effects achieved. For brevity, details are not repeated herein.

The communications device in this embodiment of this application may be an apparatus, or may be a component, an integrated circuit, or a chip in a terminal. The apparatus may be a mobile terminal, or may be a non-mobile terminal. For example, the mobile terminal may include but is not limited to the type of the terminal 11 listed above. The non-mobile terminal may be a server, a network attached storage (NAS), a personal computer (PC), a television (TV), a teller machine, or a self-service machine. This is not specifically limited in the embodiments of this application.

The communications device in this embodiment of this application may be an apparatus with an operating system. The operating system may be an Android operating system, may be an iOS operating system, or may be another possible operating system. This is not specifically limited in the embodiments of this application.

The communications device provided in this embodiment of this application can implement processes implemented in the method embodiments of FIG. 2 to FIG. 9 with the same technical effects achieved. To avoid repetition, details are not described herein again.

Figure 11:
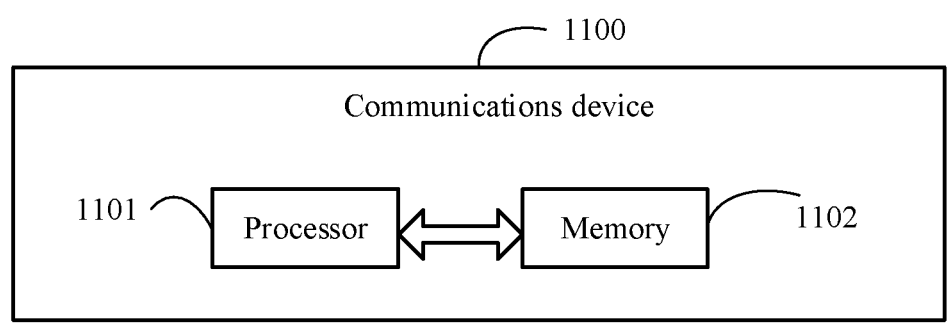
FIG. 11 is a schematic structural diagram of a communications device according to another embodiment of this application.

In some embodiments, as shown in FIG. 11, an embodiment of this application further provides a communications device 1100, including a processor 1101, a memory 1102, a program or instructions stored in the memory 1102 and may be run on the processor 1101. For example, when the communications device 1100 is a terminal, the program or the instructions are executed by the processor 1101 to implement each process of the foregoing pilot transmission method embodiment with the same technical effects achieved. In a case that the communications device 1100 is a network-side device, the program or the instructions are executed by the processor 1101 to implement each process of the foregoing pilot transmission method embodiment, and a same technical effect can be achieved. To avoid repetition, details are not described herein again.

Figure 12:
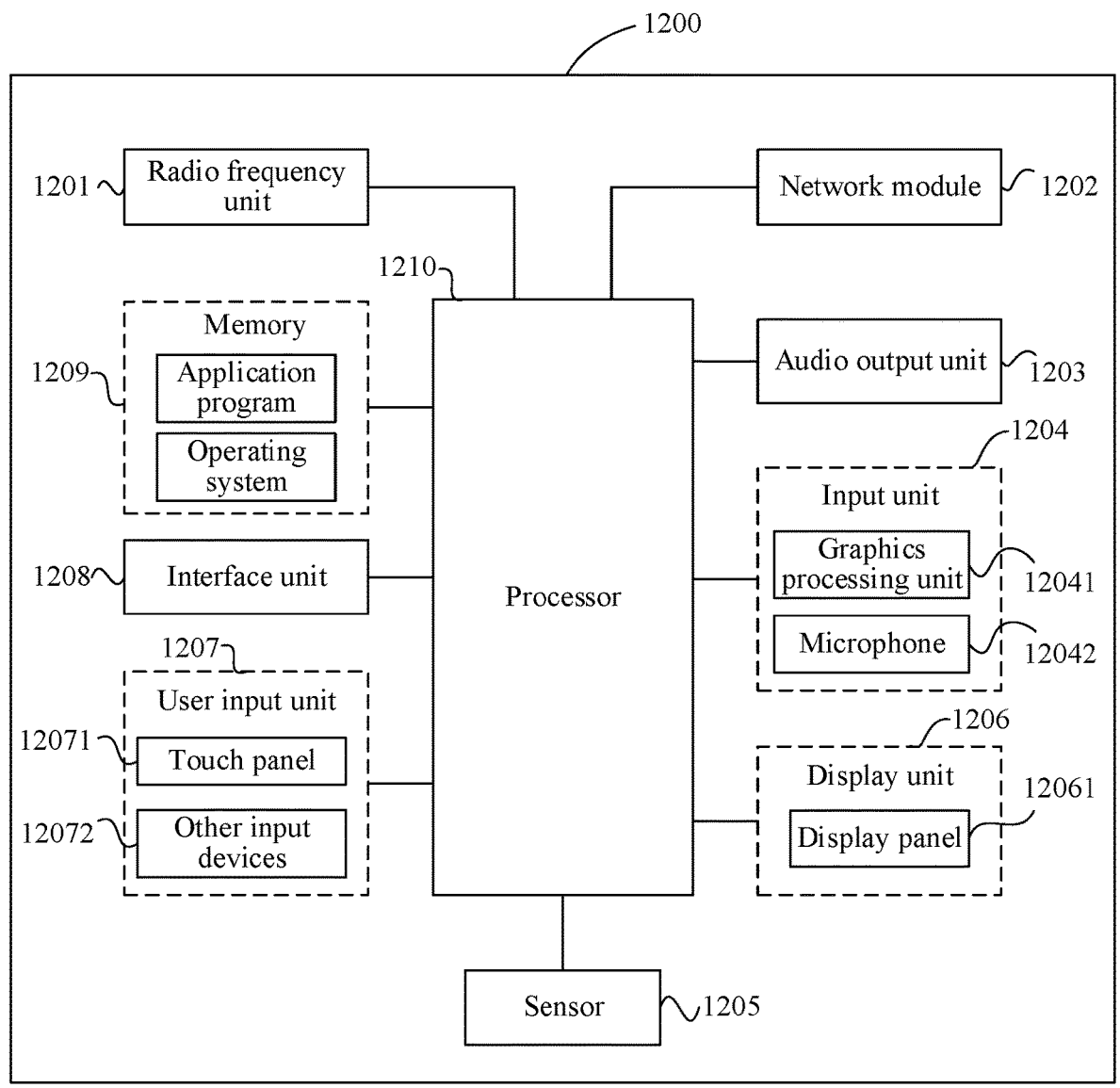
FIG. 12 is a schematic structural diagram of a terminal according to an embodiment of this application.

FIG. 12 is a schematic diagram of a hardware structure of a terminal for implementing embodiments of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and the like.

Persons skilled in the art may understand that the terminal 1200 may further include the power supply (for example, a battery) that supplies power to each component. In some embodiments, the power supply may be logically connected to the processor 1210 by using a power management system, so as to implement functions such as charging management, discharging management, and power consumption management by using the power management system. The structure of the terminal shown in FIG. 12 does not constitute a limitation on the terminal, and the terminal may include more or fewer components than shown in the diagram, or some components may be combined, or the components may be disposed in different manners. Details are not described herein again.

It should be understood that, in this embodiment of this application, the input unit 1204 may include a graphics processing unit (GPU) 12041 and a microphone 12042. The graphics processing unit 12041 processes image data of a static picture or a video that is obtained by an image capture apparatus (for example, a camera) in a video capture mode or an image capture mode. The display unit 1206 may include a display panel 12061, and the display panel 12061 may be configured in a form of a liquid crystal display, an organic light emitting diode, or the like. The user input unit 1207 includes a touch panel 12071 and other input devices 12072. The touch panel 12071 is also referred to as a touchscreen. The touch panel 12071 may include two parts: a touch detection apparatus and a touch controller. The other input devices 12072 may include but are not limited to a physical keyboard, a function key (for example, a volume control key or a switch key), a trackball, a mouse, and a joystick. Details are not described herein.

In this embodiment of this application, after receiving downlink data from a network-side device, the radio frequency unit 1201 sends the downlink data to the processor 1210 for processing, and in addition, sends uplink data to the network-side device. Generally, the radio frequency unit 1201 includes, but is not limited to, an antenna, at least one amplifier, a transceiver, a coupler, a low noise amplifier, a duplexer, and the like.

The memory 1209 may be configured to store software programs or instructions and various data. The memory 1209 may mainly include a program storage area and a data storage area. The program storage area may store an operating system, an application program required for at least one function (such as a sound play function and an image play function), and the like. In addition, the memory 1209 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. For example, at least one magnetic disk storage device, a flash memory, or another non-volatile solid-state storage device.

The processor 1210 may include one or more processing units. In some embodiments, the processor 1210 may integrate an application processor and a modem processor. The application processor mainly processes an operating system, a user interface, an application program or instructions, and the like. The modem processor mainly processes wireless communication, such as a baseband processor. It should be understood that, in some alternative embodiments, the modem processor may not be integrated into the processor 1210.

The processor 1210 is configured to insert a pilot symbol into a first data sequence to obtain a second data sequence. The radio frequency unit 1201 is configured to transmit the second data sequence, where the second data sequence has been subjected to faster-than-Nyquist processing.

In this embodiment of this application, the terminal inserts the pilot symbol into the first data sequence to obtain the second data sequence. In this way, the data symbols and the inserted pilot symbol in the second data sequence are interleaved. In this embodiment of this application, pilot symbols can be arranged in a data frame in a distributed manner. This can resolve a problem that pilots arranged in a centralized manner in a conventional solution cannot well track time-varying characteristics of a channel, and also reduces overheads. In addition, in this embodiment of this application, the insertion positions and insertion density of the pilot symbols can be flexibly adjusted based on channel status, improving flexibility of pilot transmission.

The terminal 1200 provided in this embodiment of this application may also implement processes of the foregoing pilot transmission method embodiments, and can achieve a same technical effect. To avoid repetition, details are not described herein again.

Figure 13:
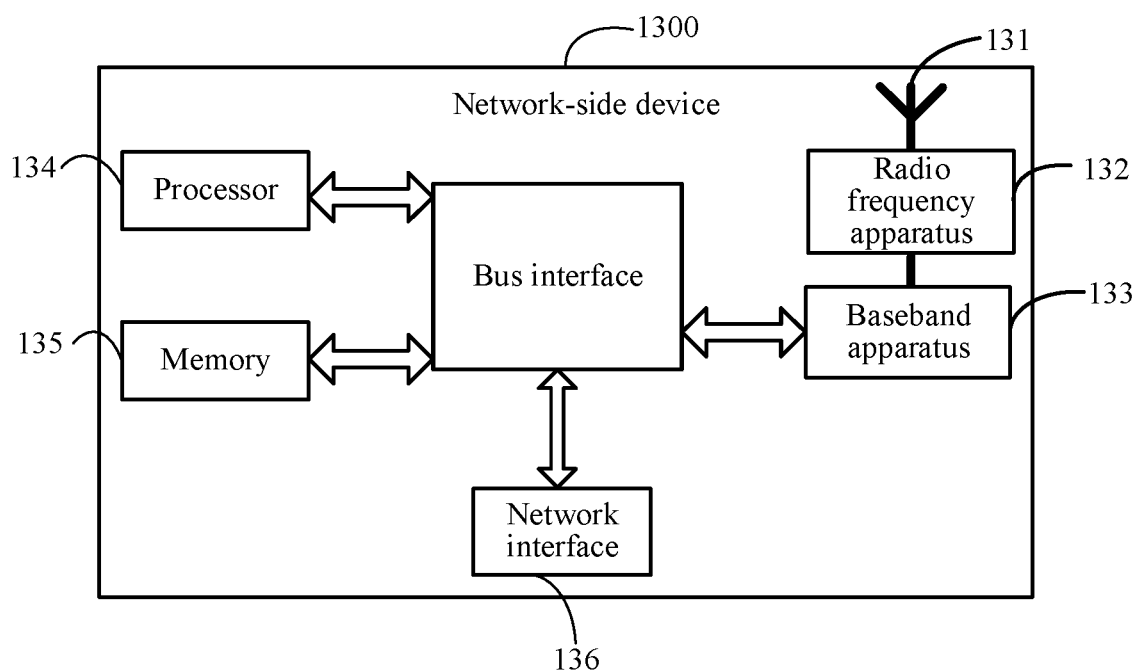
FIG. 13 is a schematic structural diagram of a network-side device according to an embodiment of this application.

For example, an embodiment of this application further provides a network-side device. As shown in FIG. 13, the network device 1300 includes an antenna 131, a radio frequency apparatus 132, and a baseband apparatus 133. The antenna 131 is connected to the radio frequency apparatus 132. In an uplink direction, the radio frequency apparatus 132 receives information by using the antenna 131, and transmits the received information to the baseband apparatus 133 for processing. In a downlink direction, the baseband apparatus 133 processes to-be-transmitted information, and transmits the information to the radio frequency apparatus 132; and the radio frequency apparatus 132 processes the received information and then transmits the information by using the antenna 131.

The frequency band processing apparatus may be located in the baseband apparatus 133. The method performed by the network-side device in the foregoing embodiment may be implemented by the baseband apparatus 133, and the baseband apparatus 133 includes a processor 134 and a memory 135.

The baseband apparatus 133 may include, for example, at least one baseband processing unit, where a plurality of chips are set on the baseband processing unit. As shown in FIG. 13, one of the chips is, for example, the processor 134, and connected to the memory 135, to invoke the program in the memory 135 to perform the operations of the network device shown in the foregoing method embodiment.

The baseband apparatus 133 may further include a network interface 136, configured to exchange information with the radio frequency apparatus 132, where the interface is, for example, a common public radio interface (CPRI).

For example, the network-side device in this embodiment of the present disclosure further includes instructions or a program stored in the memory 135 and capable of running on the processor 134. The processor 134 invokes the instructions or the program in the memory 135 to perform the method executed by the modules shown in FIG. 10, with the same technical effects achieved. To avoid repetition, details are not described herein again.

An embodiment of this application further provides a readable storage medium, where the readable storage medium stores a program or instructions, and when the program or instructions are executed by a processor, the processes of the embodiments of the foregoing pilot transmission method are implemented, with the same technical effects achieved. To avoid repetition, details are not described herein again.

The processor may be a processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement processes in the foregoing pilot transmission method embodiments, with the same technical effects achieved. To avoid repetition, details are not described herein again.

It should be understood that the chip mentioned in this embodiment of this application may also be referred to as a system-level chip, a system chip, a chip system, or a system-on-chip chip.

An embodiment of this application further provides a computer program product, where the computer program product is stored in a non-volatile memory, and the computer program product is executed by at least one processor to implement processes of the foregoing pilot transmission method embodiment, with the same technical effects achieved. To avoid repetition, details are not described herein again.

An embodiment of this application further provides a communications device, configured to execute processes of the foregoing pilot transmission method embodiments, and a same technical effect can be achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the method and apparatus in the embodiments of this application is not limited to performing a function in a sequence shown or discussed, and may further include performing a function in a basically simultaneous manner or in a reverse sequence based on a function involved. For example, the described method may be performed in a different sequence, and various steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. The method in the foregoing embodiments may also be implemented by hardware. In some embodiments, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementations. The foregoing implementations are only illustrative rather than restrictive. Inspired by this application, persons of ordinary skill in the art can still derive many variations without departing from the essence of this application and the protection scope of the claims. All these variations shall fall within the protection of this application.

What is claimed is:

1. A pilot transmission method, wherein the method comprises:
   inserting, by a communications device, a pilot symbol into a first data sequence to obtain a second data sequence; and
   transmitting, by the communications device, the second data sequence, wherein the second data sequence has been subjected to faster-than-Nyquist processing;
   wherein zero-level symbol(s) are arranged on at least one of two ends of the pilot symbol.

2. The method according to claim 1, wherein after the inserting, by a communications device, a pilot symbol into a first data sequence to obtain a second data sequence, the method further comprises:
   performing, by the communications device, upsampling processing on the second data sequence, wherein the faster-than-Nyquist processing comprises the upsampling processing.

3. The method according to claim 2, wherein after the performing upsampling processing on the second data sequence, the method further comprises:

adding a zero-level symbol to the second data sequence on at least one side of the pilot symbol.

4. The method according to claim 3, wherein the number of zero-level symbols added satisfies the following equation:

$K \geq L^\circ - 2N+1$, wherein

K is the number of zero-level symbols added; $L^\circ$ is a minimum total number of the pilot symbol and zero-level symbols adjacent to the pilot symbol after the pilot symbol is inserted; and N is an upsampling factor for the upsampling processing.

5. The method according to claim 4, wherein the minimum total number of the pilot symbol and zero-level symbols adjacent to the pilot symbol after the pilot symbol is inserted is determined using the following equation:

$$L^\circ = \lceil 2N/\tau \rceil,$$

wherein $\tau$ is a time domain overlap coefficient for the faster-than-Nyquist processing.

6. The method according to claim 1, wherein before the inserting, by a communications device, a pilot symbol into a first data sequence to obtain a second data sequence, the method further comprises:

performing, by the communications device, upsampling processing on the first data sequence, wherein the Faster-Than-Nyquist processing comprises the upsampling processing.

7. The method according to claim 6, wherein before the performing, by the communications device, upsampling processing on the first data sequence, the method further comprises:

adding a zero-level symbol to the first data sequence at a position at which the pilot symbol is to be inserted.

8. The method according to claim 7, wherein the number of zero-level symbols added satisfies the following equation:

$$q \geq \frac{L^\circ - N + 1}{N},$$

wherein q is the number of zero-level symbols added; $L^\circ$ is a minimum total number of the pilot symbol and zero-level symbols adjacent to the pilot symbol after the pilot symbol is inserted; and N is an upsampling factor for the upsampling processing.

9. The method according to claim 1, wherein in a case that zero-level symbols are arranged at both ends of the pilot symbol, the zero-level symbols at two ends of the pilot symbol are equal in quantity, or the zero-level symbols at two ends of the pilot symbol differ by 1 in quantity.

10. The method according to claim 1, wherein the second data sequence is transmitted in a first sub-frame, the first sub-frame comprising a guard gap, the pilot symbol, and a data segment.

11. The method according to claim 10, wherein a frame structure in which the first sub-frame is located comprises a plurality of such first sub-frames, each of the first sub-frames comprising one such guard gap, one such pilot symbol, and one such data segment.

12. The method according to claim 11, wherein the frame structure further comprises a second sub-frame, wherein the second sub-frame is located in a header of the frame structure, and the second sub-frame is used for transmitting a synchronization signal burst.

13. A communications device, comprising a processor, a memory, and a program or instructions stored in the memory and capable of running on the processor, wherein when the program or the instructions are executed by the processor, a pilot transmission method is implemented, wherein the pilot transmission method comprises:

inserting, by the communications device, a pilot symbol into a first data sequence to obtain a second data sequence; and transmitting, by the communications device, the second data sequence, wherein the second data sequence has been subjected to faster-than-Nyquist processing;

wherein zero-level symbol(s) are arranged on at least one of two ends of the pilot symbol.

14. The communications device according to claim 13, wherein after the inserting, by a communications device, a pilot symbol into a first data sequence to obtain a second data sequence, the method further comprises:

performing, by the communications device, upsampling processing on the second data sequence, wherein the faster-than-Nyquist processing comprises the upsampling processing.

15. The communications device according to claim 14, wherein after the performing upsampling processing on the second data sequence, the method further comprises:

adding a zero-level symbol to the second data sequence on at least one side of the pilot symbol.

16. The communications device according to claim 15, wherein the number of zero-level symbols added satisfies the following equation:

$K \geq L^\circ - 2N+1$, wherein

K is the number of zero-level symbols added; $L^\circ$ is a minimum total number of the pilot symbol and zero-level symbols adjacent to the pilot symbol after the pilot symbol is inserted; and N is an upsampling factor for the upsampling processing.

17. The communications device according to claim 13, wherein before the inserting, by a communications device, a pilot symbol into a first data sequence to obtain a second data sequence, the method further comprises:

performing, by the communications device, upsampling processing on the first data sequence, wherein the Faster-Than-Nyquist processing comprises the upsampling processing.

18. The communications device according to claim 17, wherein before the performing, by the communications device, upsampling processing on the first data sequence, the method further comprises:

adding a zero-level symbol to the first data sequence at a position at which the pilot symbol is to be inserted.

19. A non-transitory readable storage medium, wherein the non-transitory readable storage medium stores a program or instructions, and when the program or the instructions are executed by a processor, a pilot transmission method is implemented, wherein the pilot transmission method comprises:

inserting a pilot symbol into a first data sequence to obtain a second data sequence; and transmitting the second data sequence, wherein the second data sequence has been subjected to faster-than-Nyquist processing;

wherein zero-level symbol(s) are arranged on at least one of two ends of the pilot symbol.

\* \* \* \* \*